(12) United States Patent
Cai (10) Patent No.: US 9,014,317 B2
(45) Date of Patent: Apr. 21, 2015

(54) METHOD, APPARATUS, AND SYSTEM FOR FREQUENCY OFFSET ESTIMATION AND CHANNEL ESTIMATION

(71) Applicant: Huawei Technologies Co., Ltd., Shenzhen (CN)

(72) Inventor: Meng Cai, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/224,697

(22) Filed: Mar. 25, 2014

(65) Prior Publication Data

US 2014/0205045 A1   Jul. 24, 2014

Related U.S. Application Data

(63) Continuation of application No. PCT/CN2012/071768, filed on Feb. 29, 2012.

(51) Int. Cl.
*H04L 1/02* (2006.01)
*H04B 1/10* (2006.01)
*H04B 7/04* (2006.01)
*H04L 27/00* (2006.01)
*H04L 25/02* (2006.01)

(52) U.S. Cl.
CPC ...... *H04B 1/1027* (2013.01); *H04L 2027/0065* (2013.01); *H04L 25/0212* (2013.01); *H04L 25/0228* (2013.01); *H04L 27/0014* (2013.01); *H04L 2027/0046* (2013.01); *H04L 2027/0089* (2013.01); *H04B 7/0413* (2013.01); *H04B 2001/1072* (2013.01); *H04L 25/0204* (2013.01)

(58) Field of Classification Search
CPC ......... H04L 1/06; H04L 25/03; H04B 7/0845
USPC ...................... 375/343, 260.34; 370/252, 330
See application file for complete search history.

(56) References Cited

U.S. PATENT DOCUMENTS

| | | | |
|---|---|---|---|
| 8,731,038 B2 * | 5/2014 | Pean et al. | 375/232 |
| 8,797,994 B2 * | 8/2014 | Oketani | 370/330 |
| 8,848,844 B2 * | 9/2014 | Hyll et al. | 375/343 |

(Continued)

FOREIGN PATENT DOCUMENTS

| | | |
|---|---|---|
| CN | 1802831 A | 7/2006 |
| CN | 101304399 A | 11/2008 |

(Continued)

*Primary Examiner* — Khai Tran
(74) *Attorney, Agent, or Firm* — Brinks Gilson & Lione (57) ABSTRACT

A method for frequency performing offset estimation and channel estimation includes performing frequency offset estimation on the received data, and obtaining a frequency offset estimation result when interference signals in received data are not obtained, After the interference signals in the received data are obtained, the method includes performing frequency offset estimation on the received data according to the interference signals, and obtaining a frequency offset estimation result. Channel estimation is performed on the received data according to the frequency offset estimation result, and a channel estimation result is obtained. Interference signals are obtained according to the frequency offset estimation result and the channel estimation result, where the interference signals are used as parameters of the frequency offset estimation.

14 Claims, 3 Drawing Sheets

(56) References Cited

U.S. PATENT DOCUMENTS

| | | |
|---|---|---|
| 2004/0190637 A1 | 9/2004 | Maltsev et al. |
| 2005/0170831 A1 | 8/2005 | Magee et al. |
| 2008/0101496 A1 | 5/2008 | Gaikwad |
| 2010/0304687 A1 | 12/2010 | Azadet et al. |

FOREIGN PATENT DOCUMENTS

| | | |
|---|---|---|
| CN | 102130874 A | 7/2011 |
| WO | WO 2007/002924 A1 | 1/2007 |
| WO | WO 2008/038128 A2 | 4/2008 |

* cited by examiner

METHOD, APPARATUS, AND SYSTEM FOR FREQUENCY OFFSET ESTIMATION AND CHANNEL ESTIMATION

CROSS-REFERENCE TO RELATED APPLICATIONS

This application is a continuation of International Application No. PCT/CN2012/071768, filed on Feb. 29, 2012, which is hereby incorporated by reference in its entirety.

FIELD OF THE APPLICATION

The present application relates to the field of wireless communication technologies, and in particular, to a method, an apparatus, and a system for frequency offset estimation and channel estimation.

BACKGROUND OF THE APPLICATION

A microwave multiple-input multiple-output (Multiple-Input Multiple-Out-put, MIMO) system may effectively increase spectrum utilization in wireless communication. Different from the wireless MIMO, the microwave MIMO adopts distributed outdoor units (OutdoorUnit, ODU) to transmit signals. The distributed ODUs are independent ODUs in each branch of multiple paths, with independent device parameters such as frequency offset and phase noise of each branch. Therefore, each branch has different frequency offset components.

The conventional MIMO frequency offset estimation method and channel estimation method consider only the case that the frequency offsets are consistent. When the conventional method is used to perform frequency offset estimation on the distributed microwave MIMO system, the frequency offset estimation result is inaccurate. In addition, due to inconsistency between the frequency offsets of ODUs, the channel estimation result includes residual frequency offset information and is also inaccurate. Therefore, the conventional MIMO frequency offset estimation method and channel estimation method are not applicable to the frequency offset estimation and the channel estimation in the distributed microwave MIMO system.

SUMMARY OF THE APPLICATION

The technical problem to be solved by the present application is to provide a method, an apparatus, and a system for frequency offset estimation and channel estimation to increase the accuracy of frequency offset estimation and channel estimation in a distributed microwave MIMO system.

To solve the preceding technical problem, embodiments adopt the following technical solutions:

A method for frequency offset estimation and channel estimation includes:

when interference signals in received data are not obtained, performing frequency offset estimation on the received data, and obtaining a frequency offset estimation result; after the interference signals in the received data are obtained, performing frequency offset estimation on the received data according to the interference signals, and obtaining a frequency offset estimation result;

performing channel estimation on the received data according to the frequency offset estimation result, and obtaining a channel estimation result; and obtaining the interference signals according to the frequency offset estimation result and the channel estimation result, where the interference signals are used as parameters of the frequency offset estimation.

An apparatus for frequency offset estimation and channel estimation includes:

a frequency offset estimating unit, configured to: when interference signals in received data are not obtained, perform frequency offset estimation on the received data, and obtain a frequency offset estimation result; after the interference signals in the received data are obtained, perform frequency offset estimation on the received data according to the interference signals, and obtain a frequency offset estimation result;

a channel estimating unit, configured to perform channel estimation on the received data according to the frequency offset estimation result, and obtain a channel estimation result; and an interference signal obtaining unit, configured to obtain the interference signals according to the frequency offset estimation result and the channel estimation result, where the interference signals are used as parameters of the frequency offset estimation.

A system for frequency offset estimation and channel estimation includes the above apparatus for frequency offset estimation and channel estimation.

By using the method, apparatus, and system for frequency offset estimation and channel estimation according to the embodiments, in the processes of frequency offset estimation and channel estimation, interference signals that neighboring channels generate on local channel data are obtained; the obtained interference signals are used to eliminate the impact of interference signals in original data on the frequency offset estimation result, and a frequency offset estimation result is obtained; the frequency offset estimation result is used to eliminate the impact of the frequency offset on the channel estimation in the channel estimation process, and a channel estimation result is obtained; interference signals are obtained through computation according to the obtained channel estimation result and frequency offset estimation result; and an accurate frequency offset estimation result and channel estimation result are finally obtained by using a cyclic iteration mode. Therefore, compared with the prior art, the embodiments greatly increase the accuracy of the frequency offset estimation and channel estimation.

BRIEF DESCRIPTION OF THE DRAWINGS

The following drawings are provided as an aid in understanding the embodiments. The drawings illustrated exemplary embodiments of the claims. Other embodiments derived from the disclosed embodiments are understood to fall within the scope of the claims.

DETAILED DESCRIPTION OF THE EMBODIMENTS

Figure 1:
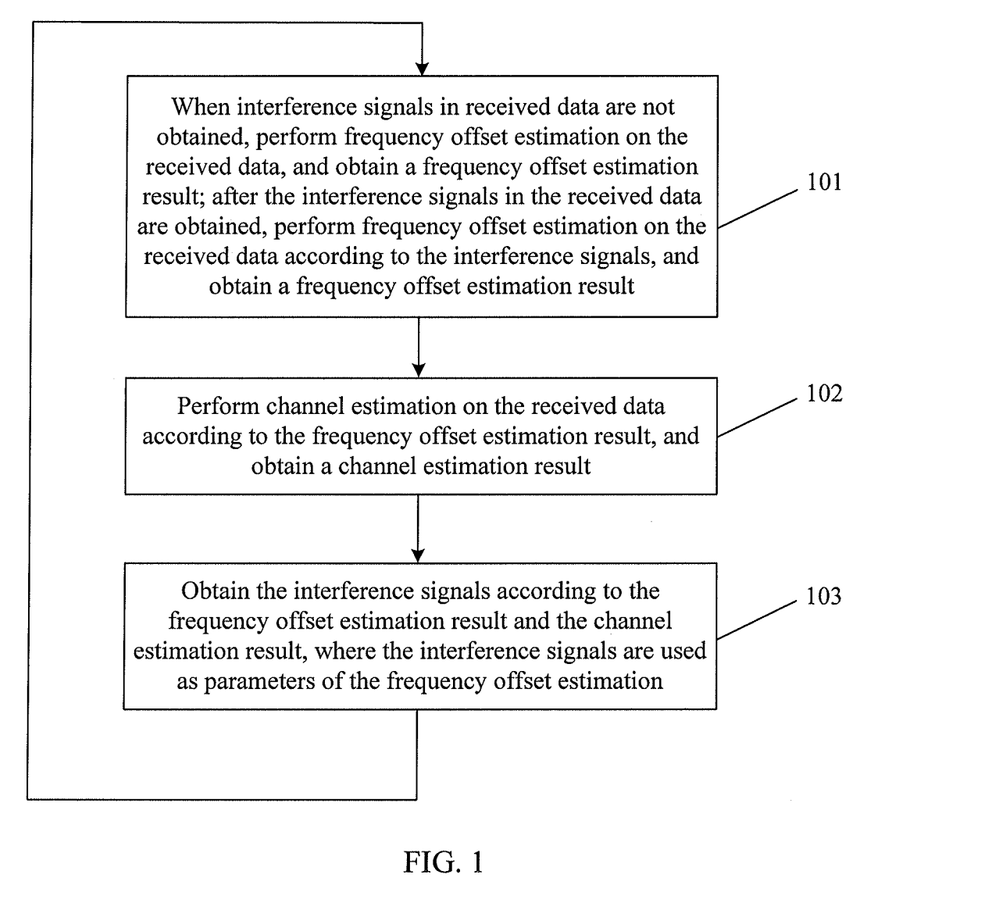
FIG. 1 is a flowchart of a method for frequency offset estimation and channel estimation according to an embodiment.

An embodiment provides a method for frequency offset estimation and channel estimation. As shown in FIG. 1, the method includes:

101. When interference signals in received data are not obtained, perform frequency offset estimation on the received data, and obtain a frequency offset estimation result; after the interference signals in the received data are obtained, perform frequency offset estimation on the received data according to the interference signals, and obtain a frequency offset estimation result.

102. Perform channel estimation on the received data according to the frequency offset estimation result, and obtain a channel estimation result.

103. Obtain the interference signals according to the frequency offset estimation result and the channel estimation result, where the interference signals are used as parameters of the frequency offset estimation.

At the initial stage of frequency offset estimation and channel estimation, even if the interference signals in the received data are not obtained, frequency offset estimation is directly performed on the received data, and the frequency offset estimation result is used in the channel estimation process; channel estimation is performed according to the frequency offset estimation result, and a channel estimation result is obtained. Because signal interference in the received data is strong, the obtained frequency offset estimation result and the channel estimation result are inaccurate and cannot be output. In addition, the interference signals in the received data are obtained according to the frequency offset estimation result and channel estimation result obtained at the initial stage. Because the frequency offset estimation result and the channel estimation result are inaccurate, the obtained interference signals are inaccurate. However, after the interference signals in the received data are obtained, the interference signals obtained at the initial stage are used in the frequency offset estimation process; in the frequency offset estimation process, interference elimination is performed on the received data, frequency offset estimation is performed on the received data, and the obtained frequency offset estimation result tends to be accurate; channel estimation is performed according to the frequency offset estimation result, and the obtained channel estimation result also tends to be accurate; interference signals are obtained according to the above channel estimation result and frequency offset estimation result, and the obtained interference signals also tend to be accurate; a frequency offset estimation result and a channel estimation result are obtained according to the obtained interference signals. The above iteration process is repeated, and the result obtained in each iteration is more accurate than the result obtained in a previous iteration; finally, accurate interference signals can be obtained, and then an accurate frequency offset estimation result and channel estimation result are obtained.

By using the method for frequency offset estimation and channel estimation according to this embodiment, in the processes of frequency offset estimation and channel estimation, interference signals in data are obtained; the obtained interference signals are used to eliminate the impact of the interference signals in original data on the frequency offset estimation result, and a frequency offset estimation result is obtained; the frequency offset estimation result is used in the channel estimation process to eliminate the impact of the frequency offset on the channel estimation, and a channel estimation result is obtained; in addition, a cyclic iteration mode is used to obtain an accurate frequency offset estimation result and channel estimation result finally. Compared with the prior art, the method provided in this embodiment greatly increases the accuracy of the frequency offset estimation and channel estimation.

Further, in this embodiment, step 102, that is, the step of performing channel estimation on the received data according to the frequency offset estimation result and obtaining a channel estimation result includes:

performing frequency offset correction on the received data according to the frequency offset estimation result, and obtaining corrected data; and performing channel estimation on the corrected data according to the frequency offset estimation result, and obtaining a channel estimation result.

During channel estimation, the frequency offset in the data causes a large error in the channel estimation. Therefore, in this embodiment, before the channel estimation is performed, the frequency offset estimation result obtained in the frequency offset estimation is firstly used to perform frequency offset correction on the data, and then channel estimation is performed on the corrected data; as the frequency offset estimation result tends to be accurate, the frequency offset in the corrected data is reduced gradually and corrected finally. In this way, the channel estimation process is not affected by the frequency offset in the data, and therefore the channel estimation result is more accurate.

Further, the method for frequency offset estimation and channel estimation according to this embodiment further includes: outputting the frequency offset estimation result and channel estimation result that comply with a preset standard.

In the mutual iteration process of the channel estimation result, frequency offset estimation result, and interference signals, the channel estimation result and frequency offset estimation result become accurate gradually; in addition, even after the channel estimation result and frequency offset estimation result tend to be accurate, they may still fluctuate. Therefore, the channel estimation result and the frequency offset estimation result need to be screened on a real-time basis according to the preset standard. In this embodiment, if the channel estimation result and the frequency offset estimation result tend to be accurate, results obtained through multiple iterations within a period of time tend to be stable but may also fluctuate. The preset standard is that the channel estimation result or the frequency offset estimation result tends to be stable and does not fluctuate. When the preset standard is met, the channel estimation result or the frequency offset estimation result is output.

Further, in this embodiment, step 101, that is, the step of performing frequency offset estimation on received data and obtaining a frequency offset estimation result specifically includes:

building training sequences of the received data into a matrix, and obtaining a first matrix;

where, to further multiply the first matrix by a matrix of known training sequences, the training sequences of the received data need to be built into a matrix, where the known training sequences are decoding training sequences used to decode the training sequences of the received data;

multiplying the first matrix by a matrix of a known first training sequence, and obtaining a frequency offset computation result, where the matrix of the known first training sequence is a matrix obtained according to a cyclic shift matrix formed by orthogonal codes and used to compute a frequency offset, that is, it is used to decode training sequences of frequency offset information in the training sequences of the received data;

where, in this embodiment, the orthogonal codes may be Zadaff-chu codes or walsh codes and the like;

obtaining a frequency offset estimation result, where the frequency offset estimation result is a quotient of the frequency offset computation result and the length of the cyclic shift matrix formed by orthogonal codes.

Further, in this embodiment, step 101, that is, the step of performing frequency offset estimation on received data according to the interference signals and obtaining a frequency offset estimation result specifically includes:

performing main data stream reconstruction on the received data according to the interference signals, eliminating interference of neighboring channels in the received data, and obtaining de-interference data;

building training sequences of the de-interference data into a matrix, and obtaining a third matrix;

multiplying the third matrix by a matrix of a known first training sequence, and obtaining a frequency offset computation result, where the matrix of the known first training sequence is a matrix obtained according to a cyclic shift matrix formed by orthogonal codes and used to compute the frequency offset; and obtaining a frequency offset estimation result, where the frequency offset estimation result is a quotient of the frequency offset computation result and the length of the cyclic shift matrix formed by orthogonal codes.

Further, in this embodiment, the performing channel estimation on the corrected data according to the frequency offset estimation result and obtaining a channel estimation result specifically includes:

building training sequences of the corrected data into a matrix, and obtaining a second matrix;

multiplying the second matrix by a matrix of a known second training sequence, and obtaining a first computation result of channel estimation, where the matrix of the second training sequence is a pseudo-inverse operation result of the cyclic shift matrix formed by orthogonal codes and used to decode frequency offset information in the training sequences of the received data;

performing conjugation transposition on the frequency offset estimation result, and obtaining a frequency offset conjugation transposition result;

multiplying the first computation result of channel estimation by the frequency offset conjugation transposition result, and obtaining a second computation result of channel estimation; and multiplying the second computation result of channel estimation by a matrix of a known third training sequence, and obtaining the channel estimation result, where the matrix of the third training sequence is a pseudo-inverse operation result of the product of the conjugation transposition of the cyclic shift matrix formed by orthogonal codes and a selection matrix, where the size of the selection matrix is $L \times N_p$, row 1 to row L of the selection matrix are unit matrixes, and other rows are zero, where L refers to the length of channel impulse response of the received data and $N_p$ refers to the length of the cyclic shift matrix formed by orthogonal codes.

Further, in this embodiment, step 103, that is, the step of obtaining the interference signals according to the frequency offset estimation result and the channel estimation result, where the interference signals are used as parameters of the frequency offset estimation, specifically includes:

multiplying the channel estimation result by the frequency offset estimation result, and obtaining an interference signal computation result; and performing convolution on the interference signal computation result and the training sequences of the neighboring channel data, and obtaining the interference signals, where the neighboring channels refer to channels that interfere with data of a channel undergoing channel estimation, for example, in a 4×4 MIMO system, there are four channels, and neighboring channels of a channel refer to other three channels than the channel.

Further, the following describes the method for frequency offset estimation and channel estimation according to this embodiment with reference to a specific scenario. Using the 4×4 MIMO system as an example, frequency offset estimation is performed on each path of data, that is, the training sequences of each path of data are built into a matrix by using a delaying apparatus; the matrix is multiplied by a matrix W that is obtained according to known training sequences and used to compute a frequency offset; $W_1$ to $W_4$ refer to pre-stored matrixes that are built by the cyclic shift matrix formed by orthogonal codes and correspond to four paths of data in the MIMO. The following is an example of $W_i$, where i=1, 2, 3, 4:

$$W_i = \begin{bmatrix} S_i^H & 0 \\ 0 & S_i^H \end{bmatrix}$$

where $S_i$ refers to the cyclic shift matrix formed by the Zadaff-chu codes, H refers to the conjugation transposition, and $S_i^{11}$ refers to the conjugation transposition of the matrix $S_i$:

$$S_1 = \begin{bmatrix} s_u(N_p-1) & s_u(18) & s_u(17) & \ldots & s_u(0) \\ s_u(0) & s_u(19) & s_u(18) & \ldots & s_u(1) \\ s_u(1) & s_u(0) & s_u(19) & \ldots & s_u(2) \\ s_u(2) & s_u(1) & s_u(0) & \ldots & s_u(3) \\ \vdots & \vdots & \vdots & \vdots & \vdots \\ s_u(16) & s_u(15) & s_u(14) & \ldots & s_u(17) \\ s_u(17) & s_u(16) & s_u(15) & \ldots & s_u(18) \\ s_u(18) & s_u(17) & s_u(16) & \ldots & s_u(N_p-1) \end{bmatrix}_{N_p \times N_p}$$

$$S_2 = \begin{bmatrix} s_u(N_p-L-1) & s_u(13) & s_u(12) & \ldots & s_u(15) \\ s_u(15) & s_u(14) & s_u(13) & \ldots & s_u(16) \\ s_u(16) & s_u(15) & s_u(14) & \ldots & s_u(17) \\ s_u(17) & s_u(16) & s_u(15) & \ldots & s_u(18) \\ \vdots & \vdots & \vdots & \vdots & \vdots \\ s_u(11) & s_u(10) & s_u(9) & \ldots & s_u(12) \\ s_u(12) & s_u(11) & s_u(10) & \ldots & s_u(13) \\ s_u(13) & s_u(12) & s_u(11) & \ldots & s_u(N_p-L-1) \end{bmatrix}_{N_p \times N_p}$$

$$S_3 = \begin{bmatrix} s_u(N_p-2L-1) & s_u(8) & s_u(7) & \ldots & s_u(10) \\ s_u(10) & s_u(9) & s_u(8) & \ldots & s_u(11) \\ s_u(11) & s_u(10) & s_u(9) & \ldots & s_u(12) \\ s_u(12) & s_u(11) & s_u(10) & \ldots & s_u(13) \\ \vdots & \vdots & \vdots & \vdots & \vdots \\ s_u(6) & s_u(5) & s_u(4) & \ldots & s_u(7) \\ s_u(7) & s_u(6) & s_u(5) & \ldots & s_u(8) \\ s_u(8) & s_u(7) & s_u(6) & \ldots & s_u(N_p-2L-1) \end{bmatrix}_{N_p \times N_p}$$

-continued $$S_4 = \begin{bmatrix} s_u(N_p-3L-1) & s_u(3) & s_u(2) & \cdots & s_u(5) \\ s_u(5) & s_u(4) & s_u(3) & \cdots & s_u(6) \\ s_u(6) & s_u(5) & s_u(4) & \cdots & s_u(7) \\ s_u(7) & s_u(6) & s_u(5) & \cdots & s_u(8) \\ \vdots & \vdots & \vdots & \vdots & \vdots \\ s_u(1) & s_u(0) & s_u(19) & \cdots & s_u(2) \\ s_u(2) & s_u(1) & s_u(0) & \cdots & s_u(3) \\ s_u(3) & s_u(2) & s_u(1) & \cdots & s_u(N_p-3L-1) \end{bmatrix}_{N_p \times N_p}$$

where $N_p$ refers to the length of the training sequences, and L refers to the length of a multi-path channel impulse response.

When n is an even number, $s_u(n) = e^{-j\pi \cdot u \cdot n^2 / N_p}$.

When n is an odd number, $s_u(n) = e^{-j\pi \cdot u \cdot n(n+1)/N_p}$.

This code complies with the following features:

$$\sum_{n=0}^{N_p-1} s_u(n) \cdot s_u^*(n-i) = \begin{cases} N_p & i=0 \\ 0 & i \neq 0 \end{cases}$$

A further operation is performed on the product of the above matrixes, and frequency estimation results of the four paths of data are obtained.

In addition, channel estimation is performed on each path of data according to the frequency offset estimation result of each path of data, and the channel estimation results of each path of data are obtained, that is, frequency offset correction is firstly performed on each path of data according to the frequency offset estimation result of each path of data, and corrected data of each path of data is obtained; then the training sequences of each path of corrected data are built into a matrix by using the delaying apparatus, and are multiplied by an inverse operation result 1 of the matrix (that is, the pseudo-inverse operation result of the cyclic shift matrix formed by orthogonal codes). The inverse operation result 1 of the matrix may be pinv (S$_1$), where piny refers to a pseudo-inverse operation, and S$_1$ refers to the cyclic shift matrix formed by Zadaff-chu codes.

Conjugation transposition is performed on the frequency offset estimation result of each path of data obtained in the previous step, and frequency offset conjugation transposition results of each path of data are obtained. The product of the matrix of each path of data is multiplied by the frequency offset conjugation transposition results of each path of data; the product is then multiplied by an inverse operation result 2 of the matrix (that is, the pseudo-inverse operation result of a product of the conjugation transposition of the cyclic shift matrix formed by orthogonal codes and a selection matrix), and channel estimation results of four paths of data are obtained, where the inverse operation result 2 of the matrix may be pinv($\Delta_L \cdot S_i^H$), where $\Delta_L$ refers to the selection matrix, that is, a matrix with the size of L×N$_p$, where row 1 to row L of the matrix are unit matrixes and other rows are zero.

After the channel estimation result and frequency offset estimation result are obtained, interference signals of each path of data are obtained according to the channel estimation result and frequency offset estimation result of each path of data; the channel estimation result of one path of data is multiplied by the frequency offset estimation result, and then convolution is performed on the obtained product and training sequences of other three paths of data, and interference signals of the first path of data may be obtained.

In a process of applying the interference signals of each path of data to the frequency offset estimation of this path of data, that is, before the frequency offset estimation is performed, main data stream reconstruction is performed on this path of data; interference that the other three paths of data generate on this path of data is eliminated according to the obtained interference signals, and de-interference data of this path of data is obtained; and then frequency offset estimation is performed on the de-interference data. The specific process of frequency offset estimation is described in the above process of this example.

Because the interference signals of each path of data are eliminated, the corresponding frequency offset estimation result is more accurate. Further, through mutual iterations of the frequency offset estimation result and the channel estimation result in the channel estimation process and frequency offset estimation process, the frequency offset estimation result and channel estimation result obtained through computation tend to be accurate gradually; if the mean square error of the receiver is smaller than a threshold (that is, the preset standard is complied with), the frequency offset estimation result or the channel estimation result may be output, where the threshold is set according to a minimum mean square error finally converged by the system.

By using the method for frequency offset estimation and channel estimation according to this embodiment, in the processes of frequency offset estimation and channel estimation, interference signals that neighboring channels generate on local channel data are obtained; the obtained interference signals are used to eliminate the impact of interference signals in original data on the frequency offset estimation result, and a frequency offset estimation result is obtained; the frequency offset estimation result is used to eliminate the impact of the frequency offset on the channel estimation in the channel estimation process, and a channel estimation result is obtained; interference signals are obtained through computation according to the obtained channel estimation result and frequency offset estimation result; and an accurate frequency offset estimation result and channel estimation result are finally obtained by using a cyclic iteration mode. Therefore, compared with the prior art, this embodiment greatly increases the accuracy of the frequency offset estimation and channel estimation.

Figure 2:
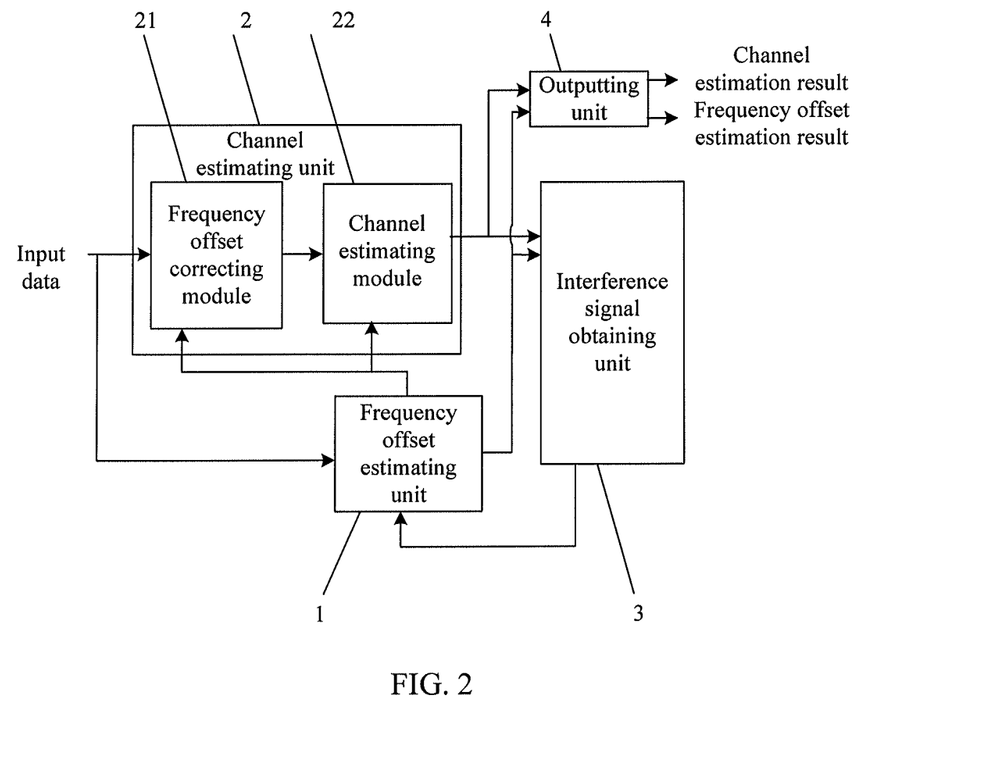
FIG. 2 is a schematic diagram of an apparatus for frequency offset estimation and channel estimation according to an embodiment.

An embodiment provides an apparatus for frequency offset estimation and channel estimation. As shown in FIG. 2, the apparatus includes:

a frequency offset estimating unit 1, configured to: when interference signals in received data are not obtained, perform frequency offset estimation on the received data, and obtain a frequency offset estimation result; after the interference signals in the received data are obtained, perform frequency offset estimation on the received data according to the interference signals, and obtain a frequency offset estimation result;

a channel estimating unit 2, configured to perform channel estimation on the received data according to the frequency offset estimation result, and obtain a channel estimation result; and an interference signal obtaining unit 3, configured to obtain the interference signals according to the frequency offset estimation result and the channel estimation result, where the interference signals are used as parameters of the frequency offset estimation.

Further, in this embodiment, the channel estimating unit 2 includes:

a frequency offset correcting module 21, configured to perform frequency offset correction on the received data according to the frequency offset estimation result, and obtain corrected data; and a channel estimating module 22, configured to perform channel estimation on the corrected data according to the frequency offset estimation result, and obtain a channel estimation result.

Further, the apparatus provided in this embodiment includes an outputting unit 4 configured to output the channel estimation result and the frequency offset estimation result that comply with a preset standard.

Figure 3:
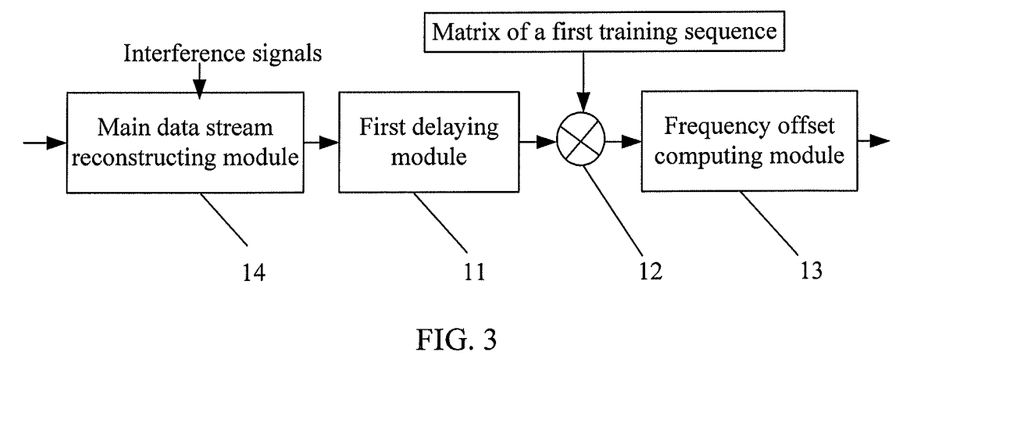
FIG. 3 is a schematic diagram of a frequency offset estimating unit according to an embodiment.

Further, in this embodiment, as shown in FIG. 3, the frequency offset estimating unit 1 includes:

a first delaying module 11, configured to build training sequences of the received data into a matrix, and obtain a first matrix, where, to further multiply the first matrix by a matrix of known training sequences, the training sequences of the received data need to be built into a matrix, where the known training sequences are decoding training sequences used to decode the training sequences of the received data;

a first multiplier 12, configured to multiply the first matrix by a matrix of a known first training sequence, and obtain a frequency offset computation result, where the matrix of the known first training sequence is a matrix obtained according to a cyclic shift matrix formed by orthogonal codes and used to compute the frequency offset; and a frequency offset computing module 13, configured to obtain the frequency offset estimation result, where the frequency offset estimation result is a quotient of the frequency offset computation result and the length of the cyclic shift matrix formed by orthogonal codes.

Further, in this embodiment, as shown in FIG. 3, the frequency offset estimating unit 1 includes:

a main data stream reconstructing module 14, configured to perform main data stream reconstruction on the received data according to the interference signals, eliminate interference of neighboring channels in the received data, and obtain de-interference data; where the first delaying module 11 is further configured to build training sequences of the de-interference data into a matrix, and obtain a third matrix; and the first multiplier 12 is further configured to multiply the third matrix by the matrix of the known first training sequence, and obtain a frequency offset computation result, where the matrix of the known first training sequence is a matrix obtained according to a cyclic shift matrix formed by orthogonal codes and used to compute the frequency offset.

Figure 4:
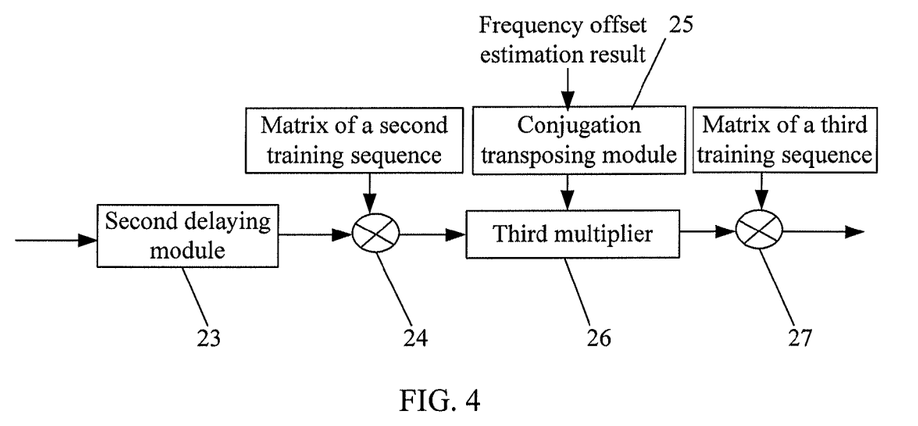
FIG. 4 is a schematic diagram of a channel estimating module according to an embodiment.

Further, in this embodiment, as shown in FIG. 4, the channel estimating module 22 includes:

a second delaying module 23, configured to build training sequences of the corrected data into a matrix, and obtain a second matrix;

a second multiplier 24, configured to multiply the second matrix by a matrix of a known second training sequence, and obtain a first computation result of channel estimation, where the matrix of the second training sequence is a pseudo-inverse operation result of the cyclic shift matrix formed by orthogonal codes;

a conjugation transposing module 25, configured to perform conjugation transposition on the frequency offset estimation result, and obtain a frequency offset conjugation transposition result;

a third multiplier 26, configured to multiply the first computation result of channel estimation by the frequency offset conjugation transposition result, and obtain a second computation result of channel estimation; and a fourth multiplier 27, configured to multiply the second computation result of channel estimation by a matrix of a known third training sequence, and obtain a channel estimation result, where the matrix of the third training sequence is a pseudo-inverse operation result of the product of the conjugation transposition of the cyclic shift matrix formed by orthogonal codes and a selection matrix, where the size of the selection matrix is $L \times N_p$, row 1 to row L of the selection matrix are unit matrixes, and other rows are zero, where L refers to a length of channel impulse response of the received data and $N_p$ refers to the length of the cyclic shift matrix formed by orthogonal codes.

Figure 5:
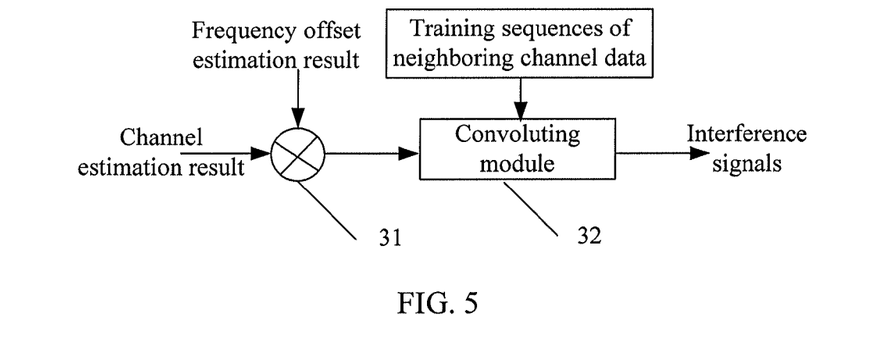
FIG. 5 is a schematic diagram of an interference signal obtaining unit according to an embodiment.

Further, in this embodiment, as shown in FIG. 5, the interference signal obtaining unit 3 includes:

a fifth multiplier 31, configured to multiply the channel estimation result by the frequency offset estimation result, and obtain an interference signal computation result; and a convoluting module 32, configured to perform convolution on the interference signal computation result and the training sequences of the neighboring channel data, and obtain the interference signals.

By using the apparatus for frequency offset estimation and channel estimation according to this embodiment, in the processes of frequency offset estimation and channel estimation, interference signals that neighboring channels generate on local channel data are obtained; the obtained interference signals are used to eliminate the impact of interference signals in original data on the frequency offset estimation result, and a frequency offset estimation result is obtained; the frequency offset estimation result is used to eliminate the impact of the frequency offset on the channel estimation in the channel estimation process, and a channel estimation result is obtained; interference signals are obtained through computation according to the obtained channel estimation result and frequency offset estimation result; and an accurate frequency offset estimation result and channel estimation result are finally obtained by using a cyclic iteration mode. Therefore, compared with the prior art, this embodiment greatly increases the accuracy of the frequency offset estimation and channel estimation.

An embodiment also provides a system for frequency offset estimation and channel estimation. The system includes the apparatus for frequency offset estimation and channel estimation according to the foregoing embodiment.

Through the above description of the embodiments, it is clear to persons skilled in the art that the embodiments may be implemented, via instruction code stored in non-transitory computer readable media, by a computer. The instruction code may be stored in a, for example, a floppy disk, hard disk, or optical disk of the computer, and contains several instructions used to instruct computer equipment (for example, a personal computer, a server, or network equipment) to perform the operations described above.

The foregoing embodiments are merely exemplary and are not intended to limit the scope of the claims. Variations or replacements may be made by persons skilled in the art to the disclosed embodiments. Such embodiments are understood to fall within the scope of the claims.

What is claimed is:

1. A method for performing frequency offset estimation and channel estimation, comprising:

when interference signals in received data are not obtained, performing frequency offset estimation on the received data, and obtaining a first frequency offset estimation result;

after the interference signals in the received data are obtained, performing frequency offset estimation on the received data according to the interference signals, and obtaining a second frequency offset estimation result;

performing channel estimation on the received data according to the first and the second frequency offset estimation results, and obtaining a channel estimation result; and obtaining the interference signals according to the first or the second frequency offset estimation result and the channel estimation result, wherein the interference signals are used as parameters of the second frequency offset estimation.

2. The method according to claim 1, wherein performing channel estimation on the received data according to the first and second frequency offset estimation results and obtaining a channel estimation result comprises:

performing frequency offset correction on the received data according to the first and second frequency offset estimation result;

obtaining corrected data; and performing channel estimation on the corrected data according to the first and second frequency offset estimation results; and obtaining the channel estimation result.

3. The method according to claim 1, further comprising: outputting the channel estimation result and the first and second frequency offset estimation results that comply with a preset standard.

4. The method according to claim 1, wherein performing frequency offset estimation on the received data and obtaining a first and second frequency offset estimation results comprises:

building training sequences of the received data into a matrix;

obtaining a first matrix;

multiplying the first matrix by a matrix of a known first training sequence;

obtaining a frequency offset computation result, wherein the matrix of the known first training sequence is a matrix obtained according to a cyclic shift matrix formed by orthogonal codes and used to compute a frequency offset; and obtaining the first and second frequency offset estimation results, wherein the first and second frequency offset estimation results are quotients of the frequency offset computation result and the length of the cyclic shift matrix formed by orthogonal codes.

5. The method according to claim 1, wherein performing frequency offset estimation on the received data according to the interference signals and obtaining the first and second frequency offset estimation results comprises:

performing main data stream reconstruction on the received data according to the interference signals;

eliminating interference of neighboring channels in the received data;

obtaining de-interference data;

building training sequences of the de-interference data into a matrix;

obtaining a third matrix;

multiplying the third matrix by a matrix of a known first training sequence;

obtaining a frequency offset computation result, wherein the matrix of the known first training sequence is a matrix obtained according to a cyclic shift matrix formed by orthogonal codes and used to compute a frequency offset; and obtaining the first and second frequency offset estimation results, wherein the first and second frequency offset estimation results are quotients of the frequency offset computation result and the length of the cyclic shift matrix formed by orthogonal codes.

6. The method according to claim 2, wherein performing channel estimation on the corrected data according to the first and second frequency offset estimation results and obtaining a channel estimation result comprises:

building training sequences of the corrected data into a matrix;

obtaining a second matrix;

multiplying the second matrix by a matrix of a known second training sequence;

obtaining a first computation result of channel estimation, wherein the matrix of the known second training sequence is a pseudo-inverse operation result of a cyclic shift matrix formed by orthogonal codes;

performing conjugation transposition on the frequency offset estimation result;

obtaining a frequency offset conjugation transposition result;

multiplying the first computation result of channel estimation by the frequency offset conjugation transposition result;

obtaining a second computation result of channel estimation; and multiplying the second computation result of channel estimation by a matrix of a known third training sequence;

obtaining the channel estimation result, wherein the matrix of the known third training sequence is a pseudo-inverse operation result of a product of the conjugation transposition of the cyclic shift matrix formed by orthogonal codes and a selection matrix, wherein a size of the selection matrix is $L \times N_p$, row 1 to row L of the selection matrix are unit matrixes, and other rows are zero, wherein L refers to a length of a channel impulse response of the received data and $N_p$ refers to the length of the cyclic shift matrix formed by orthogonal codes.

7. The method according to claim 1, wherein obtaining the interference signals according to the first and second frequency offset estimation results and the channel estimation result comprises:

multiplying the channel estimation result by the first and second frequency offset estimation result, and obtaining an interference signal computation result; and performing convolution on the interference signal computation result and training sequences of neighboring channel data; and obtaining the interference signals.

8. An apparatus for frequency offset estimation and channel estimation, comprising:

a frequency offset estimating unit configured to: when interference signals in received data are not obtained, perform frequency offset estimation on the received data, and obtain a first frequency offset estimation result; after the interference signals in the received data are obtained, perform frequency offset estimation on the received data according to the interference signals, and obtain a second frequency offset estimation result;

a channel estimating unit configured to perform channel estimation on the received data according to the first and second frequency offset estimation results, and obtain a channel estimation result; and an interference signal obtaining unit configured to obtain the interference signals according to the frequency offset estimation result and the channel estimation result, wherein the interference signals are used as parameters of the frequency offset estimation.

9. The apparatus according to claim 8, wherein the channel estimating unit comprises:
a frequency offset correcting module configured to perform frequency offset correction on the received data according to the first and second frequency offset estimation result, and obtain corrected data; and
a channel estimating module configured to perform channel estimation on the corrected data according to the first and second frequency offset estimation results, and obtain a channel estimation result.

10. The apparatus according to claim 8, further comprising: an outputting unit configured to output the channel estimation result and the first and second frequency offset estimation results that comply with a preset standard.

11. The apparatus according to claim 8, wherein the frequency offset estimating unit comprises:
a first delaying module configured to build training sequences of the received data into a matrix, and obtain a first matrix;
a first multiplier configured to multiply the first matrix by a matrix of a known first training sequence, and obtain a frequency offset computation result, wherein the matrix of the known first training sequence is a matrix obtained according to a cyclic shift matrix formed by orthogonal codes and used to compute a frequency offset; and
a frequency offset computing module configured to obtain the first and second frequency offset estimation results, wherein the first and second frequency offset estimation result are quotients of the frequency offset computation result and the length of the cyclic shift matrix formed by orthogonal codes.

12. The apparatus according to claim 11, wherein the frequency offset estimating unit further comprises:
a main data stream reconstructing module configured to perform main data stream reconstruction on the received data according to the interference signals, eliminate interference of neighboring channels in the received data, and obtain de-interference data; wherein
the first delaying module is further configured to build training sequences of the de-interference data into a matrix, and obtain a third matrix; and
the first multiplier is further configured to multiply the third matrix by the matrix of the known first training sequence, and obtain a frequency offset computation result, wherein the matrix of the known first training sequence is a matrix obtained according to the cyclic shift matrix formed by orthogonal codes and used to compute the frequency offset.

13. The apparatus according to claim 9, wherein the channel estimating module comprises:
a second delaying module configured to build training sequences of the corrected data into a matrix, and obtain a second matrix;
a second multiplier configured to multiply the second matrix by a matrix of a known second training sequence, and obtain a first computation result of channel estimation, wherein the matrix of the known second training sequence is a pseudo-inverse operation result of a cyclic shift matrix formed by orthogonal codes;
a conjugation transposing module configured to perform conjugation transposition on the first and second frequency offset estimation result, and obtain a frequency offset conjugation transposition result;
a third multiplier configured to multiply the first computation result of channel estimation by the frequency offset conjugation transposition result, and obtain a second computation result of channel estimation; and
a fourth multiplier configured to multiply the second computation result of channel estimation by a matrix of a known third training sequence, and obtain the channel estimation result, wherein the matrix of the known third training sequence is a pseudo-inverse operation result of a product of the conjugation transposition of the cyclic shift matrix formed by orthogonal codes and a selection matrix, wherein the size of the selection matrix is $L \times N_p$, row 1 to row L of the selection matrix are unit matrixes, and other rows are zero, wherein L refers to a length of channel an impulse response of the received data and $N_p$ refers to the length of the cyclic shift matrix formed by orthogonal codes.

14. The apparatus according to claim 8, wherein the interference signal obtaining unit comprises:
a fifth multiplier configured to multiply the channel estimation result by the frequency offset estimation result, and obtain an interference signal computation result; and
a convoluting module configured to perform convolution on the interference signal computation result and training sequences of neighboring channel data, and obtain the interference signals.

* * * * *